United States Patent
Takada et al.

[11] Patent Number: 5,620,372
[45] Date of Patent: Apr. 15, 1997

[54] TORQUE LIMITING MECHANISM FOR TWO ROTARY MEMBERS

[75] Inventors: Seiichi Takada, Tokyo; Noriko Kurita, Kuwana, both of Japan

[73] Assignee: NTN Corporation, Osaka, Japan

[21] Appl. No.: 521,048

[22] Filed: Aug. 29, 1995

[30] Foreign Application Priority Data

Aug. 30, 1994 [JP] Japan ................... 6-205341

[51] Int. Cl.$^6$ ................................................. F16H 35/10
[52] U.S. Cl. ................................................. 464/40; 464/57
[58] Field of Search ....................... 464/40, 51, 57, 464/60, 30; 267/155, 275

[56] References Cited

U.S. PATENT DOCUMENTS

| | | | |
|---|---|---|---|
| 2,595,454 | 5/1952 | Greenlee | 464/40 |
| 3,450,365 | 6/1969 | Kaplan | 464/40 X |
| 5,150,771 | 9/1992 | Porter | 188/67 |

FOREIGN PATENT DOCUMENTS

| | | | |
|---|---|---|---|
| 463248 | 1/1992 | European Pat. Off. | 464/40 |
| 479544 | 4/1992 | European Pat. Off. | 464/40 |
| 4307129 | 10/1992 | Japan | 464/40 |
| 5106641 | 4/1993 | Japan | 464/40 |
| 5126160 | 5/1993 | Japan | 464/40 |
| 5164140 | 6/1993 | Japan | 464/40 |

Primary Examiner—Daniel P. Stodola
Assistant Examiner—William A. Rivera
Attorney, Agent, or Firm—Wenderoth, Lind & Ponack

[57] ABSTRACT

A torque limiter having an inner cylinder, an outer cylinder rotatably mounted around the inner cylinder, a closure member mounted between the outer cylinder and the inner cylinder to close one end of the outer cylinder, a coil spring mounted between the inner cylinder and the outer cylinder and having one end coupled to the outer cylinder and the other end coupled to the closure member so as to be tightened against the outer peripheral surface of the inner cylinder. The outer peripheral surface of the inner cylinder has a roughness Ra (arithmetical mean deviation) of 0.6–1.0, and the coil spring is formed of a wire having a circular cross-section.

2 Claims, 2 Drawing Sheets

TORQUE LIMITING MECHANISM FOR TWO ROTARY MEMBERS

BACKGROUND OF THE INVENTION

This invention relates to a torque limiter for selectively coupling and decoupling two rotary members according to the torque applied.

FIG. 2 shows a conventional torque limiter. An outer cylinder 21 is rotatably mounted around an inner cylinder 20. A coil spring 22 is provided between the cylinders.

The coil spring 22 is formed from a wire having a square section, and has a small-diameter portion 22a and a large-diameter portion 22b. The small-diameter portion 22a and the large-diameter portion 22b comprise a continuous wire having helical turns 22c and 22d having their adjacent turns in close contact with each other.

The small-diameter portion 22a has its inner periphery 22e pressed against the outer periphery 20a of the inner cylinder 20. The outer periphery 20a is smoothly finished with its roughness Ra (arithmetical mean deviation) being about 0.07. Grease is applied to the portion of the outer periphery 20a adapted to be brought into contact with the inner periphery 22e to form a lubricating oil film between the inner periphery 22e and the outer periphery 20a.

The coil spring 22 has an engaging portion 23 on one end thereof, i.e. on the end of the small-diameter portion 22a, and has an engaging portion 24 on the other end, i.e. the end of the large-diameter portion 22b. The engaging portion 23 is coupled to one end portion 25 of the outer cylinder 21, whereas the engaging portion 24 is coupled to a closure member 27 fitted in the other end 26 of the outer cylinder 21.

The maximum torque that can be transmitted between the inner cylinder 20 and the outer cylinder 21 (hereinafter referred to as "limit torque") is determined by the force with which the small-diameter portion 22a is tightened against the inner cylinder 20 and the friction coefficient between the inner periphery 22e and the outer periphery 20a.

As the rotating speed of the inner cylinder 20 increases, the slip speed between the small-diameter portion 22a and the outer periphery 20a correspondingly increases due to the increasing difference in rotating speed between the inner cylinder 20 and the outer cylinder 21. As shown in FIG. 3, this causes the lubricating condition in the area between the inner periphery 22e and the outer periphery 20a to change from boundary lubrication to a mixture of fluid lubrication and boundary lubrication, resulting in a reduced friction coefficient between the inner periphery 22e and the outer periphery 20a. The limit torque thus drops.

Further, since the helical turns 22c forming the small-diameter portion 22a have their sides in close contact with each other, it is difficult for grease to enter the space between the inner periphery 22e and the outer periphery 20a, so that the outer periphery 20a tends to wear quickly, causing fluctuations in the limit torque especially at the beginning of use.

An object of this invention is to provide a torque limiter which keeps a high limit torque at a high rotating speed and, which suffers no fluctuation in limit torque at the beginning of use.

SUMMARY OF THE INVENTION

According to this invention, there is provided a torque limiter having an inner cylinder, an outer cylinder and rotatably mounted around the inner cylinder, a closure member mounted between the outer cylinder and the inner cylinder so as to rotate together with the inner cylinder to close one end of the outer cylinder. A coil spring is mounted between the inner cylinder and the outer cylinder and has one end thereof coupled to the outer cylinder and the other end coupled to the closure member so as to be tightened against the outer peripheral surface of the inner cylinder. Also, a lubricating oil film is formed between the inner peripheral surface of the coil spring and the outer peripheral surface of the inner cylinder. Further, the outer peripheral surface of the inner cylinder has a roughness Ra (arithmetical mean deviation) of 0.6–1.0, and the coil spring is formed of a wire having a circular cross-section.

The coil spring may have gaps formed between the adjacent turns.

The inner cylinder has a rather rough outer peripheral surface, i.e. a surface having a roughness Ra (arithmetical mean deviation) of 0.6–1.0, it is impossible to form a sufficiently thick lubricating oil film between the inner periphery of the coil spring and the outer periphery of the inner cylinder. This makes it difficult for the lubricating condition to change from boundary lubrication to fluid lubrication due to changes in the slip speed.

Since the coil spring is formed from a wire having a circular cross-section, the contact area between the inner periphery of the coil spring and the outer periphery of the inner cylinder can be reduced to a minimum. This further makes it difficult for the lubricating condition to change with the slip speed.

As a result, the friction coefficient between the inner periphery of the coil spring and the outer periphery of the inner cylinder is kept from decreasing even while the rotating speed is high.

Since gaps are provided between the adjacent helical turns, grease can be distributed throughout the frictional surface, so that it is possible to delay the progression of wear of the outer periphery and achieve a stable limit value just after the start of use.

Other features and objects of the present invention will become apparent from the following description made with reference to the accompanying drawings, in which:

DETAILED DESCRIPTION OF THE PREFERRED EMBODIMENT

Figure 1:
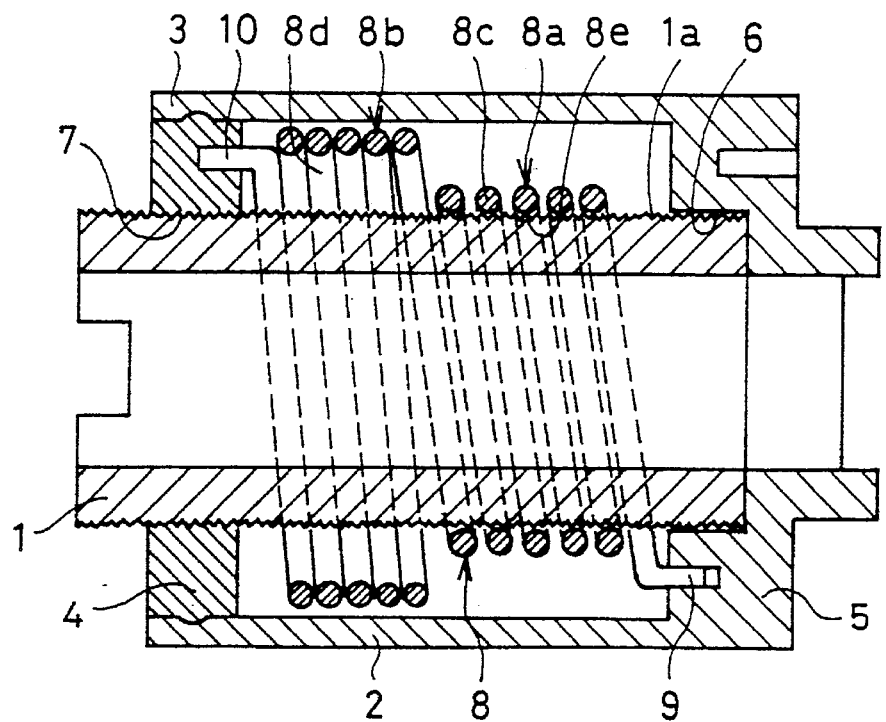
FIG. 1 is a sectional view of an embodiment of the invention.
Figure 2:
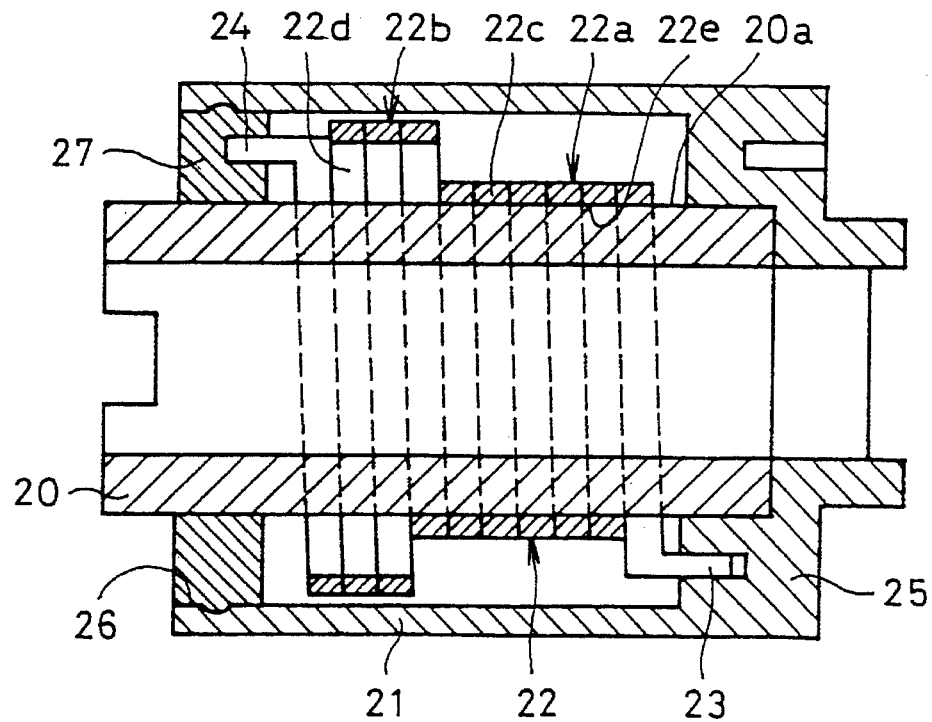
FIG. 2 is a sectional view of the prior art.
Figure 3:
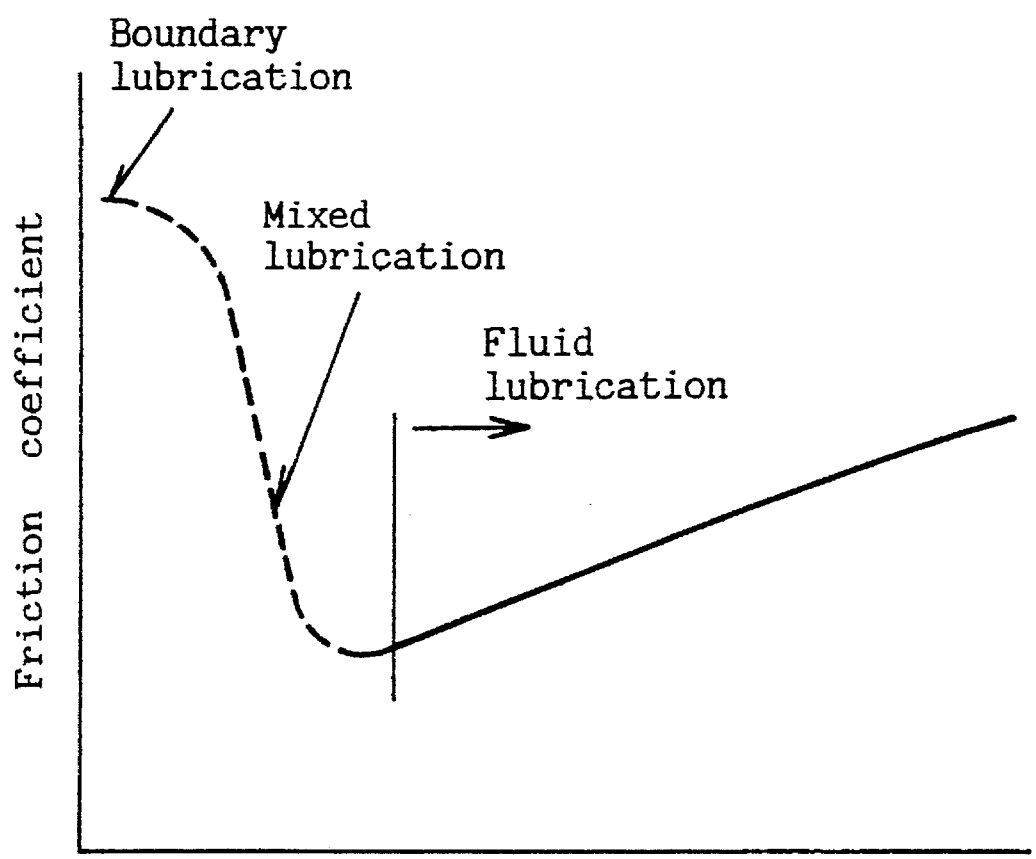
FIG. 3 is a graph showing how the lubricating condition and the friction coefficient change with the slip speed.

We will now describe the embodiment of this invention with reference to FIG. 1.

As shown in FIG. 1, the torque limiter of the embodiment has an inner cylinder 1 and an outer cylinder 2 mounted around the inner cylinder 1. A closure member 4 is fitted in an open end 3 of the outer cylinder 2 so as to rotate together with the inner cylinder 1. A recess 6 is formed in the inner surface of an end 5 of the outer cylinder 2. The closure member 4 is formed with a through hole 7. The inner cylinder 1 has its one end extending through the hole 7 and the other end received in the recess 6, so that the inner cylinder 1 and the outer cylinder 2 are rotatable relative to each other.

A coil spring 8 is mounted between the inner cylinder 1 and the outer cylinder 2. It is formed of a wire having a circular cross-section, and includes a small-diameter portion 8a and a large-diameter portion 8b. The small-diameter portion 8a and the large-diameter portion 8b include helical turns 8c and 8d that are continuous with each other. Gaps are provided between the adjacent turns.

The small-diameter portion 8a has its inner periphery 8e pressed against the outer periphery 1a of the inner cylinder 1. Grease is applied to the portion of the outer periphery 1a to be brought into contact with the inner periphery 8e.

The surface roughness of the outer periphery 1a is determined so that the roughness Ra (arithmetical mean deviation) will be 0.6–1.0, preferably around 0.8.

The coil spring has an engaging portion 9 on one end thereof, i.e. on the end of the small-diameter portion 8a, and has an engaging portion 10 on the other end, i.e. the end of the large-diameter portion 8b. The engaging portion 9 is coupled to the end 5 of the outer cylinder 2, whereas the engaging portion 10 is coupled to the closure member 4.

Now in operation, when the inner cylinder 1 is rotated in the direction in which the coil spring 8 is wound, the small-diameter portion 8a is twisted in the winding direction of the coil spring due to the friction between the inner periphery 8e of the coil spring 8 and the outer periphery 1a of the inner cylinder 1. The small-diameter portion 8a tends to diametrically expand in this state, because it has its end unrotatably fixed to the outer cylinder 2 through the engaging portion 9.

But since the inner periphery 8e is initially pressed against the outer periphery 1a, they will be kept in contact with each other while the sum of the torque exerted on the outer cylinder 2 and the torque applied to the inner cylinder 1 is smaller than the limit torque. In this state, the rotation of the inner cylinder 1 is transmitted to the outer cylinder 2 through the coil spring 8.

If the sum exceeds the limit torque, the small-diameter portion 8a will actually expand diametrically, so that the inner periphery 8e will slip relative to the outer periphery 1a. Now the inner cylinder 1 is decoupled from the outer cylinder 2, allowing the inner and outer cylinders to rotate relative to each other.

When the inner cylinder 1 is rotated in the direction opposite to the direction in which the coil spring 8 is wound, the coil spring 8 is twisted in such a way as to be tightened around the inner cylinder 1 due to the friction between the inner periphery 8e and the outer periphery 1a. The small-diameter portion 8a thus tends to shrink diametrically.

The coil spring 8 and the inner cylinder 1 are thus locked together, so that the outer cylinder 2 and the inner cylinder 1 rotate together.

The limit torque, i.e. the maximum torque that can be transmitted between the inner cylinder 1 and the outer cylinder 2, is determined by the force with which the small-diameter portion 8a is tightened against the inner cylinder 1 and the friction coefficient between the inner periphery 8e and the outer periphery 1a. Therefore, in order to keep the limit torque at a sufficiently high level while the rotating speed is high, the friction coefficient between the inner periphery 8e and the outer periphery 1a has to be kept from decreasing.

According to this invention, because the outer periphery 1a has a sufficiently high surface roughness, i.e. 0.6–1.0 in Ra, it is impossible to form a sufficiently thick lubricating oil film between the inner periphery 8e of the coil spring 8 and the outer periphery 1a of the inner cylinder 1. This makes it unlikely for the lubricating condition to change from boundary lubrication to fluid lubrication with corresponding changes in the slip speed.

Then, since the coil spring 8 is formed from a wire having a circular cross-section, the contact area between the inner periphery 8e and the outer periphery 1a is reduced to a minimum. This reduces the change in the lubricating condition due to changes in the slip speed.

As a result, the friction coefficient between the inner periphery 8e and the outer periphery 1a is kept from decreasing even while the rotating speed is high.

Also, by providing gaps between the adjacent turns at the small-diameter portion 8a, grease can be distributed throughout the frictional surface, so that it is possible to delay the progression of wear of the outer periphery 1a.

Thus, it is possible to suppress a drop in the limit torque with the lapse of time.

A test was conducted by repeatedly rotating the inner cylinder 1 at 800 rpm (rotating for two seconds and stopping it for 0.2 second) while applying a torque of 200 gf cm on the inner cylinder 1.

With this arrangement, the lubricating condition between the inner periphery of the coil spring and the outer periphery of the inner cylinder changes changes with the change in slip speed.

What is claimed is:

1. A torque limiter comprising:

an outer cylinder having a first end and a second end;

an inner cylinder rotatably mounted within said outer cylinder;

a closure member mounted between an outer peripheral surface of said inner cylinder and an inner peripheral surface of said outer cylinder adjacent said first end of said outer cylinder;

a coil spring mounted between said inner cylinder and said outer cylinder, and said coil spring having a first end connected to said closure member and a second end connected to said second end of said outer cylinder; and a lubricating oil film between an inner peripheral surface of said coil spring and an outer peripheral surface of said inner cylinder, wherein said inner periphery of said coil spring is in contact with said outer peripheral surface of said inner cylinder, and said outer peripheral surface of said inner cylinder has a roughness Ra of 0.6–1.0, and said coil spring has a circular cross-section to minimize the contact area between said inner peripheral surface of said coil spring and said outer peripheral surface of said inner cylinder having said roughness Ra of 0.6–1.0, with said lubricating oil film present at the contacting areas between said coil spring and said inner cylinder.

2. The torque limiter as claimed in claim 1, wherein said coil spring has a portion at which gaps are formed between adjacent turns of said coil spring.

* * * * *